(12) United States Patent
Manson

(10) Patent No.: US 8,443,722 B2
(45) Date of Patent: May 21, 2013

(54) COOKING RACK ACCESSORY

(76) Inventor: William C. Manson, Calumet City, IL (US)

( * ) Notice: Subject to any disclaimer, the term of this patent is extended or adjusted under 35 U.S.C. 154(b) by 248 days.

(21) Appl. No.: 11/828,719

(22) Filed: Jul. 26, 2007

(65) Prior Publication Data
US 2009/0029022 A1    Jan. 29, 2009

(51) Int. Cl.
*A47J 37/07*  (2006.01)
*A23L 1/01*  (2006.01)
*F24C 13/00*  (2006.01)

(52) U.S. Cl.
USPC .................. 99/482; 99/340; 99/450; 99/467; 126/5; 126/20; 126/369

(58) Field of Classification Search
USPC .................. 99/326–333, 352–355, 483, 339, 99/340, 444–450, 467–482; 126/25 R, 41 R, 126/5, 20, 9 R, 369
See application file for complete search history.

(56) References Cited

U.S. PATENT DOCUMENTS

| | | | | |
|---|---|---|---|---|
| 4,732,137 A * | 3/1988 | Parsons | ........................ | 126/25 R |
| 4,773,319 A * | 9/1988 | Holland | ........................ | 99/446 |
| 4,913,039 A * | 4/1990 | Sutphen | ........................ | 99/339 |
| 5,367,951 A * | 11/1994 | Purvis | ........................ | 99/450 |
| 5,501,142 A * | 3/1996 | Bailey | ........................ | 99/482 |
| 6,062,129 A * | 5/2000 | Tippmann et al. | ........................ | 99/330 |
| 6,158,426 A * | 12/2000 | Wardell | ........................ | 126/25 R |
| 6,431,164 B1 * | 8/2002 | Wardell | ........................ | 126/5 |
| 7,469,630 B1 * | 12/2008 | Ray | ........................ | 99/482 |

* cited by examiner

*Primary Examiner* — Joseph M Pelham
(74) *Attorney, Agent, or Firm* — Husch Blackwell LLP

(57) ABSTRACT

A cooking rack accessory for steaming food and a method thereof. The cooking rack accessory comprises of a support frame that includes a toroidal fluid reservoir configured to store a fluid. A manifold is disposed above the fluid reservoir and is in fluid communication with the fluid reservoir. A toroidal steam chamber is disposed above the manifold and is in fluid communication with the manifold and the fluid reservoir. A plurality of coupling members is coupled to the support frame and configured to selectably couple to a cooking rack. The coupling members are elongated members extending from the fluid reservoir and arch over a cooking rack. A plurality of steam apertures is disposed through the steam chamber to release steam. A selectably sealable fill aperture includes a spout member coupled to a funnel member, which is all in fluid communication with each other and with the fluid reservoir.

3 Claims, 6 Drawing Sheets

COOKING RACK ACCESSORY

BACKGROUND OF THE INVENTION

1. Field of the Invention

The present invention relates to a cooking rack accessory, specifically a cooking rack accessory for steaming and cooking food.

2. Description of the Related Art

Outdoor grilling and barbequing have become extremely popular way to cook and prepare food. The grill or barbeque gives the food an added flavor not found in conventional cooking, such as stove top cooking, using a frying pan and using an oven to cook and prepare the food. Sometimes grillers would like to steam or smoke the food during the grilling or cooking process to give the food an added flavor. The steam or smoke permeates through the food to impart the food with the desired flavor. Prior art devices have been utilized to continually baste or steam the food during cooking. However, the steaming devices are inefficient and the basting devices are expensive and complicated. Some improvements have been made in the field. Examples of references related to the present invention are described below, and the supported teachings of each reference are incorporated by reference herein:

U.S. Pat. No. 6,431,164, issued to Wardell, discloses a water circulated grill including a housing containing spaced apart food supporting tubes and with a water catching system including spaced apart collection troughs to receive condensed water dropping from the sides of the water cooled supporting tubes, a steamer positioned beneath the water cooled food supporting tubes and above a heat supply source, whereby the heat supply source will heat the steamer to generate steam that moves between collection troughs to cook food placed on the tubes and wherein a water source supplying water to the steamer also supplies water to a water chamber of a steamer pot that has a burner receiving fuel from the same source that supplies fuel to the heat source.

U.S. Pat. No. 6,158,426, issued to Wardell, discloses a water circulated grill with spaced apart food supporting tubes and with a water catching system including spaced apart collection troughs to receive condensed water dropping from the sides of the water cooled supporting tubes and heat supply source positioned beneath the collection troughs to supply heat upwardly between the water collection troughs to cook food placed on the food supporting tubes and to heat the collection troughs and vaporize water collected therein.

U.S. Pat. No. 6,062,129, issued to Tippmann et al., discloses a griddle having a base with a surface for cooking food items that is heated by pressurized steam circulated through a passageway in the base from a temperature controlled boiler. Steam injected beneath a cover adapted to be placed over the food items cooking on the heated surface can greatly decrease the required cooking time for the food item. A grill heated by the same pressurized steam is also disclosed with a similar cover and steam injection feature.

U.S. Pat. No. 5,501,142, issued to Bailey, discloses a steamer device that is an elongated enclosed structure which is configured to receive and contain an amount of steamer liquid. The steamer device is placed within a bed of heated grill briquettes below the grilling surface of a grill assembly. The steamer device uses the heat from the briquettes to evaporate the steamer liquid and create flavored steam. Steam release openings formed in the enclosed structure direct the steam out of the device and towards the grilling surface to flavor the food being grilled on the surface. When the grilling surface and steamer device are enclosed, a steam atmosphere is created which flavors and moistens the food while providing a quicker cooking time and reduced flaming. The steam device does not alter operation of the grill nor prevent the natural juices of the food from falling onto a heated surface and being burned or evaporated to further flavor the grilled food. The device is inexpensive and simple to operate and functions continuously to steam the food while it cooks.

U.S. Pat. No. 5,367,951, issued to Purvis, discloses a grill steamer tray both for steaming food that is being cooked on a grill and for collecting grease drippings from the food to prevent an undesirable flaming of the grill. The tray includes a plurality of depressions that may be filled with water to steam the food as well as to collect the grease drippings. A plurality of openings are provided between the depressions to allow heat and smoke to pass through the openings for cooking purposes. The tray further includes removable finned tray liners that fit into the depressions to provide for easier cleaning of the tray after use.

U.S. Pat. No. 4,773,319, issued to Holland, discloses a barbecue grill including a housing having a bottom surface, a heat source adjacent the bottom surface, a heat deflector positioned above the heat source for uniform heat distribution, a grease collection and drainage system, a food supporting grate and a removable hood. Heat is evenly distributed throughout the housing by the heat deflector, and grease from food on the food supporting grate is efficiently collected and disposed of by the grease collection and drainage system. The grease collection and drainage system is adapted to easily convert the barbecue grill to use as both a smoker and a steamer.

The inventions heretofore known suffer from a number of disadvantages which include being inconvenient, being heavy, being expensive, being limited in portability, and being complex.

What is needed is a cooking rack accessory that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available cooking rack accessories for steaming food. Accordingly, the present invention has been developed to provide an inexpensive and convenient cooking rack accessory for steaming food.

A cooking rack accessory for steaming food that may comprise of a support frame that may include a toroidal fluid reservoir. The toroidal fluid reservoir may be configured to contain a fluid. A manifold may be disposed above the fluid reservoir and may be in fluid communication with the fluid reservoir. In addition, a toroidal steam chamber may be disposed above the manifold and may be in fluid communication with the manifold and the fluid reservoir. A plurality of coupling members may be coupled to the support frame and may be configured to selectably couple to a cooking rack. The coupling members may be elongated members that may extend orthogonally from the fluid reservoir. The coupling members may contain a top portion which arches over a portion of a cooking rack, to secure the cooking rack accessory to the cooking rack. A plurality of steam apertures may be disposed through the steam chamber to release steam. A selectably sealable fill aperture may be in fluid communication with the fluid reservoir and may be configured to receive a fluid. Furthermore, the selectably sealable fill aperture may include a spout member that may be coupled to a funnel member. The selectably sealable fill aperture, spout member, and funnel member may be in fluid communication with the fluid reservoir.

A method of steaming food that may comprise the steps of filling a fluid reservoir of a cooking rack accessory with fluid through a fill aperture. Preheating the cooking rack accessory on a first heat source to a first elevated temperature. Transporting the cooking rack accessory to a grill, heated to a second elevated temperature, having a cooking rack; and disposing food above the cooking rack and the cooking rack accessory, to cook and/or steam food above the second elevated temperature source. The preheating of the cooking rack accessory to a first elevated temperature coincides with heating the grill or second elevated temperature source to a second elevated temperature. The first elevated temperature may be at least the temperature to produce steam. Filling the fluid reservoir with fluid further may include selectably unsealing an aperture cap member, then disposing fluid into a funnel member and filling the fluid reservoir with fluid. Then selectably sealing the aperture cap member to the spout member. The cooking rack accessory may be coupled substantially below the cooking rack. The cooking rack accessory may be transported to the second heat source by the cooking rack. Furthermore, food may be displaced on the cooking rack, being above the cooking rack accessory and the second elevated temperature source to cook and/or steam the food. Additional fluid may be added to the cooking rack accessory to continue cooking and/or steaming the food.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not therefore to be considered to be limiting of its scope, the invention will be described and explained with additional specificity and detail through the use of the accompanying drawing(s), in which.

DETAILED DESCRIPTION OF THE INVENTION

Figure 1:
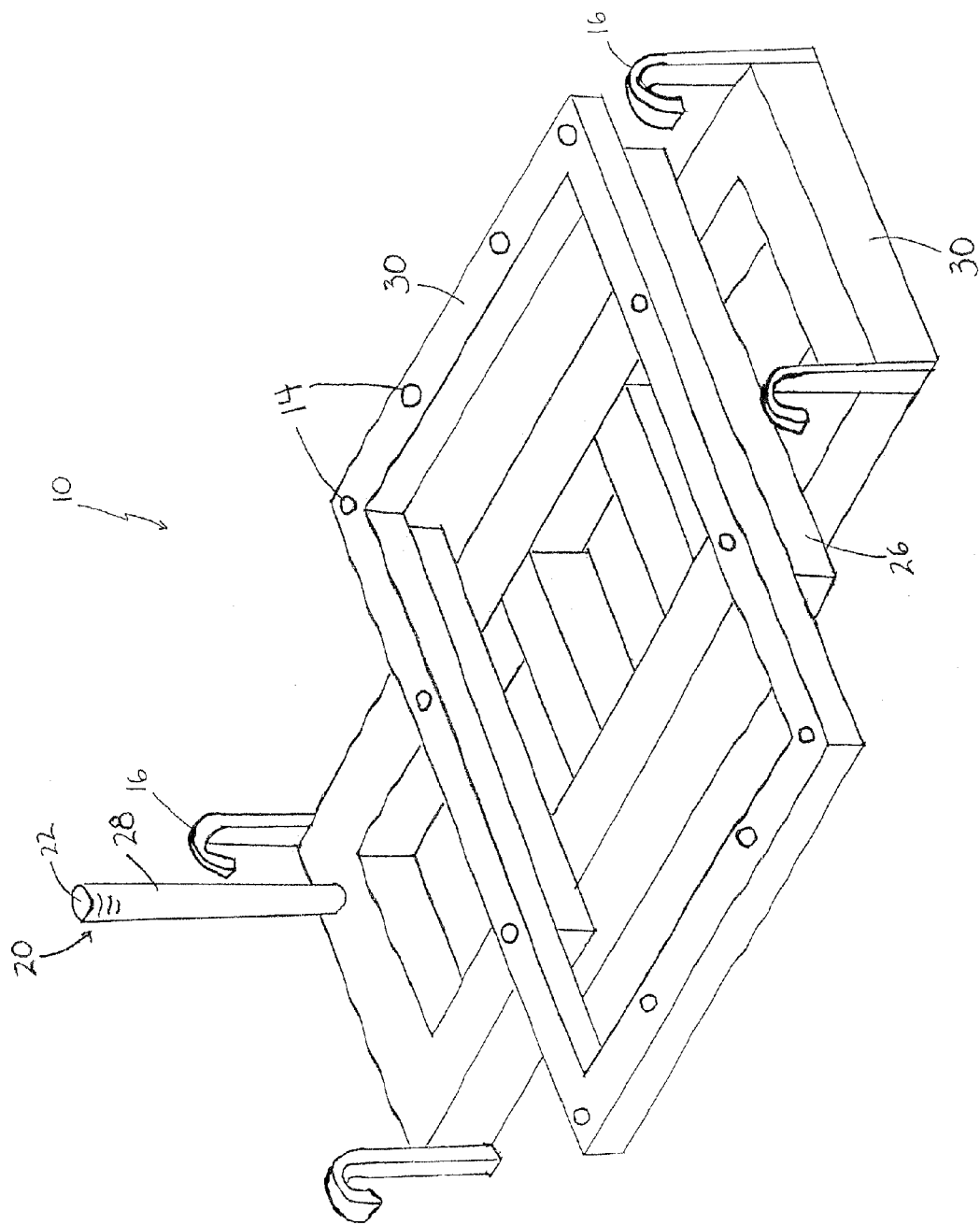
FIG. 1 illustrates a top perspective view of a cooking rack accessory, according to one embodiment on the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a top perspective view of a cooking rack accessory 10 comprising of a support frame 30. The support frame 30 is includes a toroidal steam chamber 12, a manifold 26, and a toroidal fluid reservoir 18. The toroidal steam chamber 12 additionally includes a plurality of steam apertures 14. The cooking rack accessory 10 further includes a selectably sealable fill aperture 20. The selectably sealable fill aperture 20 includes a spout member 22 and a funnel member 28. The selectably sealable fill aperture 20 is configured to be in fluid communication with the toroidal fluid reservoir 18. The cooking rack accessory 10 also includes coupling members 16 configured to couple to a cooking rack 24.

Figure 2:
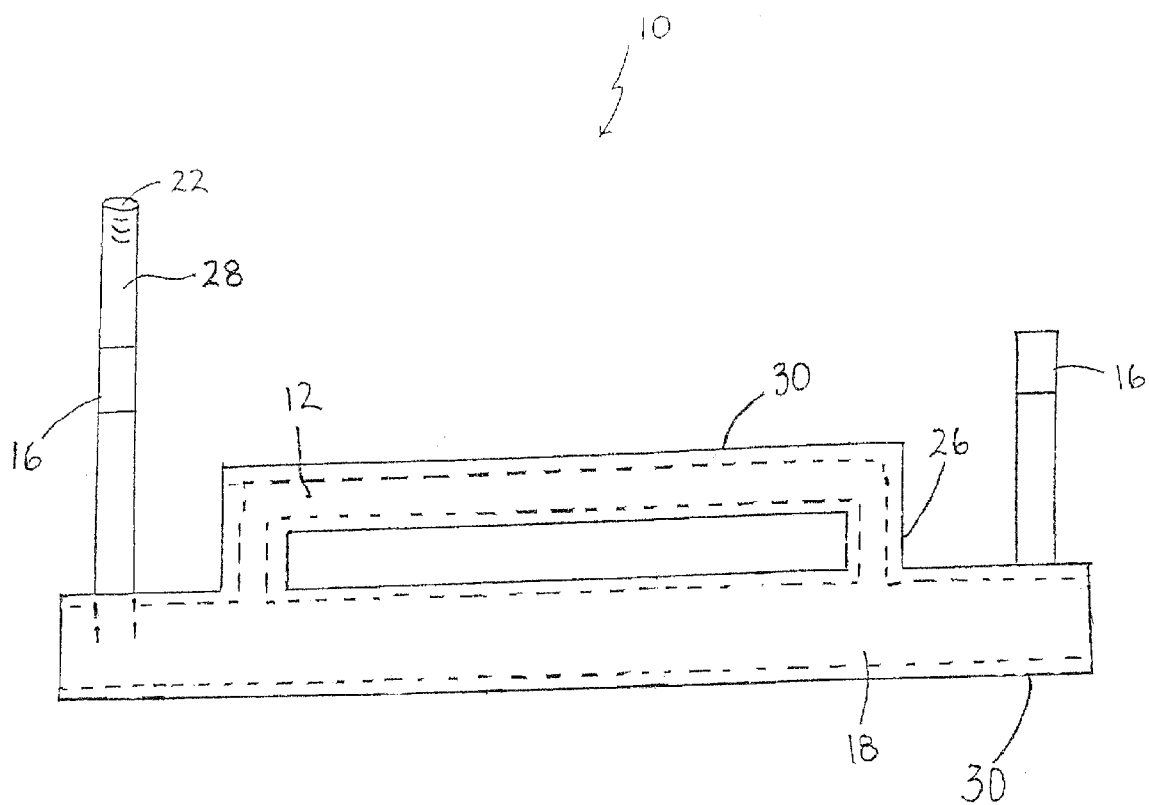
FIG. 2 illustrates a front view of a cooking rack accessory, according to one embodiment of the invention.
Figure 3:
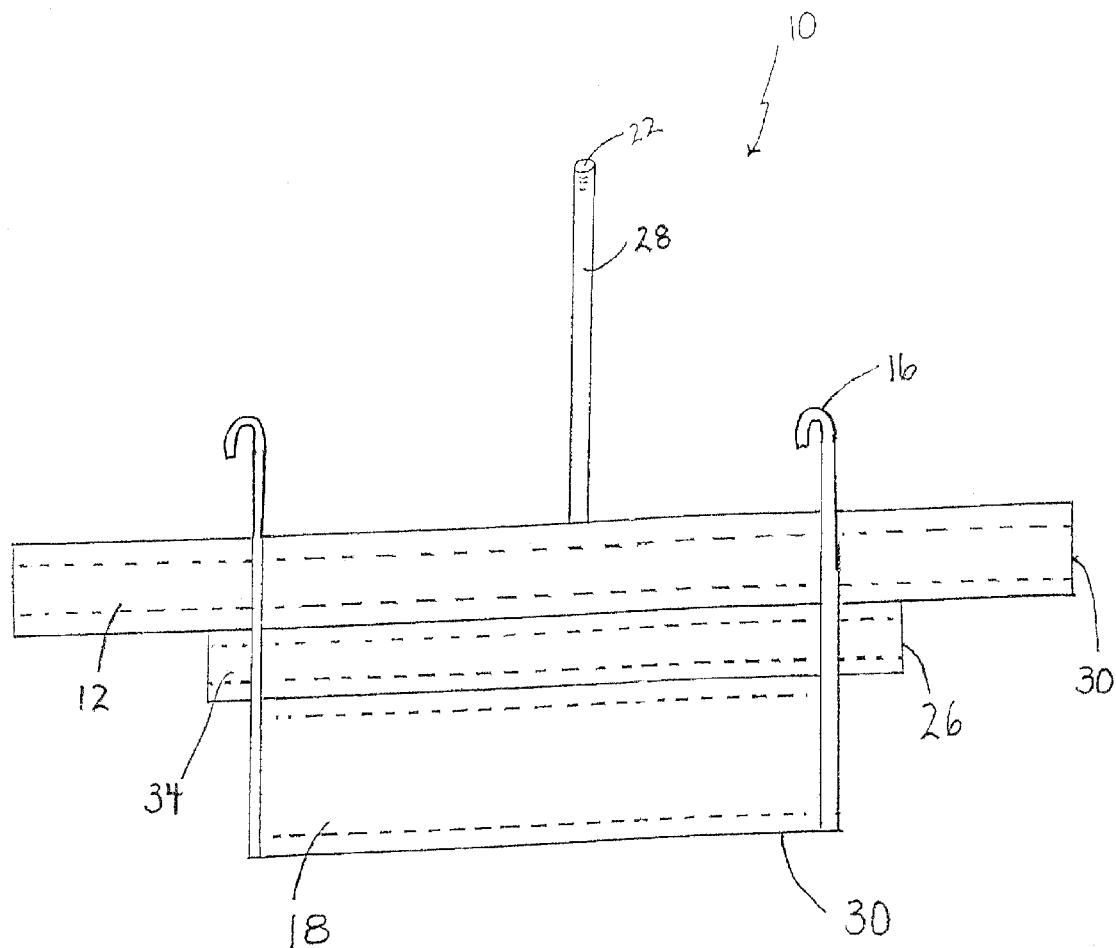
FIG. 3 illustrates a side view of a cooking rack accessory, according to one embodiment of the invention.

FIGS. 2 and 3 illustrate a side plan views of a cooking rack accessory 10 comprising of a selectably sealable fill aperture in fluid communication with the toroidal fluid reservoir 18. The selectably sealable fill aperture includes a spout member 22 and a funnel member 28. The toroidal fluid reservoir 18 is configured to be in fluid communication with the manifold 26. The manifold 26 is configured to be in fluid communication with the toroidal steam chamber 12. The figure illustrates the coupling members 16 coupling to the support frame 30.

Figure 4:
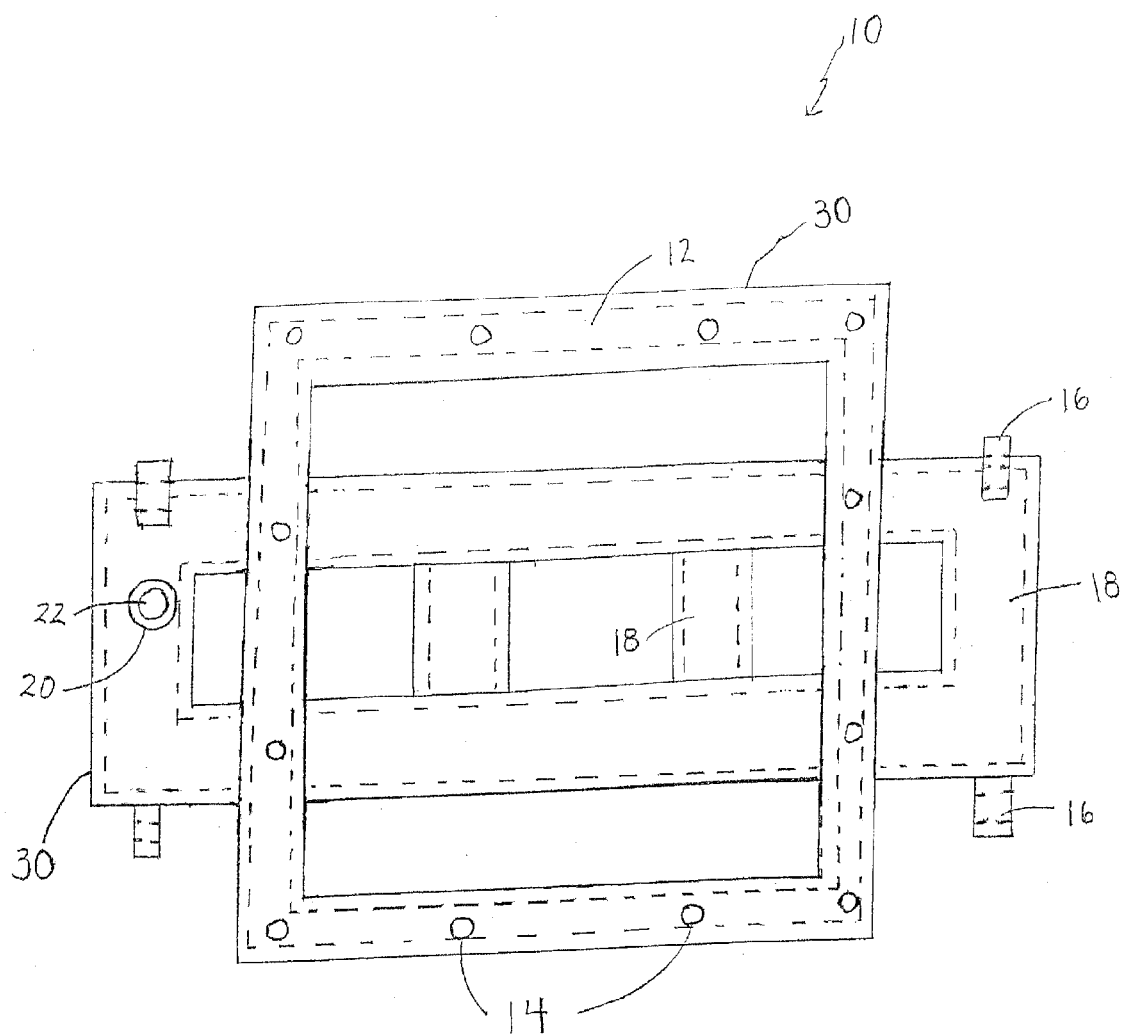
FIG. 4 illustrates a top plan view of a cooking rack accessory, according to one embodiment of the invention.

FIG. 4 illustrates a top plan view of a cooking rack accessory 10 comprising of a support frame 30. The support frame 30 includes a toroidal steam chamber 12, a manifold 26, and a toroidal fluid reservoir 18. The manifold 26 is in fluid communication with the toroidal steam chamber 12 and the toroidal fluid reservoir 18. The toroidal steam chamber 12 includes a plurality of steam apertures 14 configured to be in fluid communication with the toroidal steam chamber. A selectably sealable fill aperture is coupled to the support frame 30 and in fluid communication with the toroidal fluid reservoir 18. The selectably sealable fill aperture includes a spout member 22 and a funnel member 28. Coupling members coupled to the support frame are configured to couple to a cooking rack 24.

Figure 5:
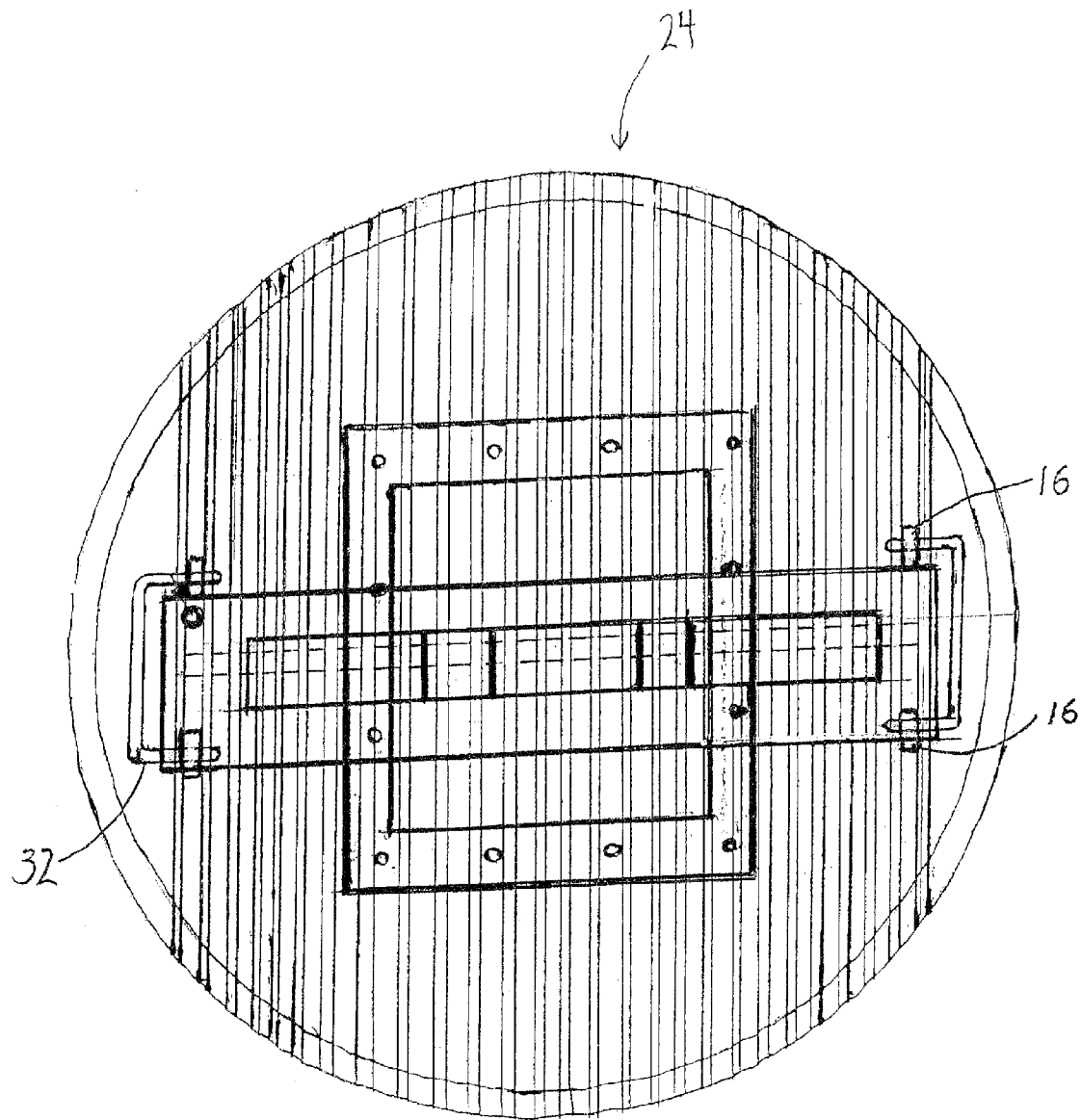
FIG. 5 illustrates a top plan view of a cooking rack accessory coupled to a cooking rack, according to one embodiment of the invention.
Figure 6:
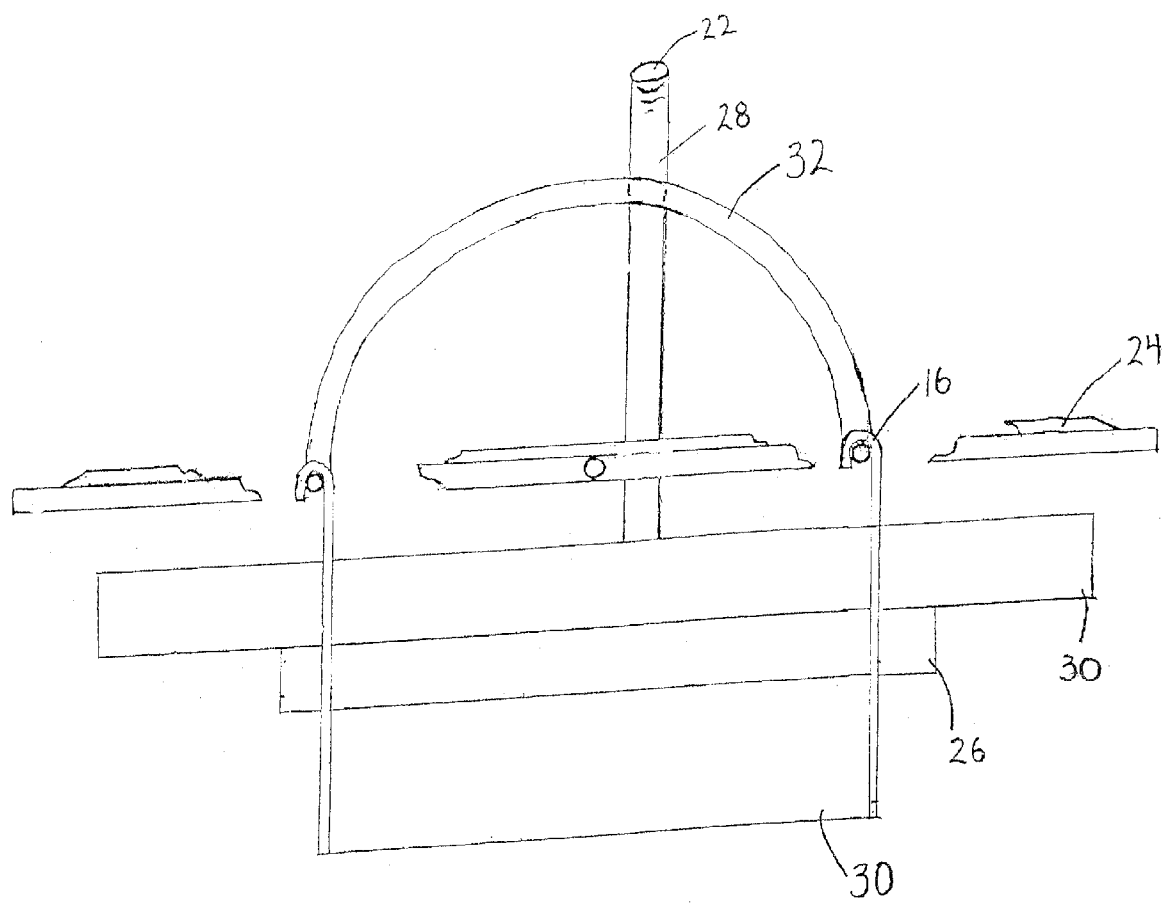
FIG. 6 illustrates a side plan view of a cooking rack accessory coupled to a cooking rack, according to one embodiment of the invention.

FIG. 5 illustrates a top view of a cooking rack accessory 10 coupled to a cooking rack 24. The cooking rack accessory is coupled to the cooking rack by the coupling members 16. The coupling members 16 are configured to couple about the cooking rack handle 32. FIG. 6 illustrates a side view of a cooking rack accessory coupled to a cooking rack 24. The illustration shows that the coupling members 16 of the cooking rack accessory 10 coupled about a cooking rack handle. The illustration further shows a selectably sealable fill aperture of the cooking rack accessory 10. The illustration also shows cut away structure of a cooking rack 24.

In operation of a grill accessory, a user places the grill accessory on top of a stove. The user fills the grill accessory full of a fluid through a fill aperture and turns on the stove. After the grill accessory heats up to a temperature to convert the fluid to steam; the user picks up a grill rack by a set of handles and couples a set of hooks from the grill accessory to the grill rack. The user then transports the steaming grill accessory to a grill. Charcoal has been added and heated in the grill; wherein the grill is at the temperature to convert the fluid to steam. The user disposes the grill accessory, by the grill's handles, into the grill displacing the charcoal about the grill accessory. The grill rack is disposed within the grill. The user may displace food on top of the grill rack to cook and/or steam the food.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the illustration shows four coupling members, one skilled in the art would appreciate that the coupling members may vary in size, shape, configuration, design, orientation, length, width, and in number and still perform its intended function.

Additionally, although the figures illustrate a selectably sealable fill aperture comprising of a funnel member and a spout member, one skilled in the art would appreciate that the funnel member and the spout member may vary in design, shape, configuration, orientation, color, size, width, length, thickness and still perform their intended functions It is also envisioned that the toroidal steam chamber, toroidal fluid reservoir, and the fluid chamber may vary in design, shape, configuration, orientation, color, size, width, length and still perform their intended functions.

It is expected that there could be numerous variations of the design of this invention. An example is that the steam apertures may vary in size, shape, position, orientation, configuration, diameter and still perform its intended function.

Finally, it is envisioned that the components of the device may be constructed of a variety of materials, such as but not limited to metal, metal alloys, high temperature resistant material and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A cooking rack accessory for steaming food, comprising:
   a) a support frame including:
      a1) a toroidal fluid reservoir configured to contain a fluid;
      a2) a manifold disposed above the fluid reservoir and in fluid communication with the fluid reservoir; and
      a3) a toroidal steam chamber disposed above the manifold and in fluid communication with the manifold;
   b) a plurality of coupling members coupled to the support frame configured to selectably couple to a cooking rack;
   c) a plurality of steam apertures disposed through the steam chamber; and
   d) a selectably sealable fill aperture in fluid communication with the fluid reservoir and configured to receive a fluid.

2. A cooking rack accessory as in claim 1, wherein the coupling members are elongated members extending orthogonally from the fluid reservoir and having a top portion which arches over a portion of a cooking rack.

3. A cooking rack accessory as in claim 1, wherein the selectably sealable fill aperture includes a spout member coupled to a funnel member in fluid communication with the fluid reservoir.

* * * * *